Figure 1:
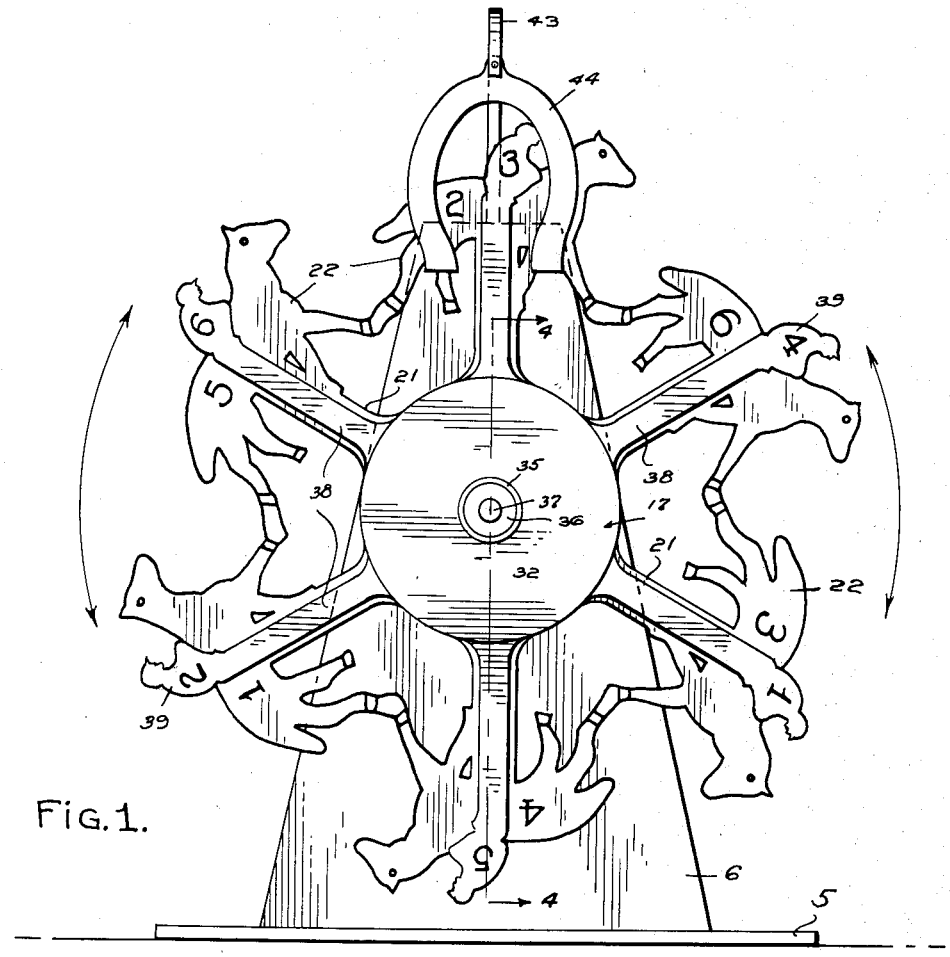

Oct. 4, 1955  W. H. ROTHGERY  2,719,718
ROTARY GAME DEVICE

Filed April 12, 1954  3 Sheets-Sheet 1

INVENTOR.
WALTER H. ROTHGERY,
BY
ATTORNEY.

Oct. 4, 1955
W. H. ROTHGERY
2,719,718
ROTARY GAME DEVICE
Filed April 12, 1954
3 Sheets-Sheet 2
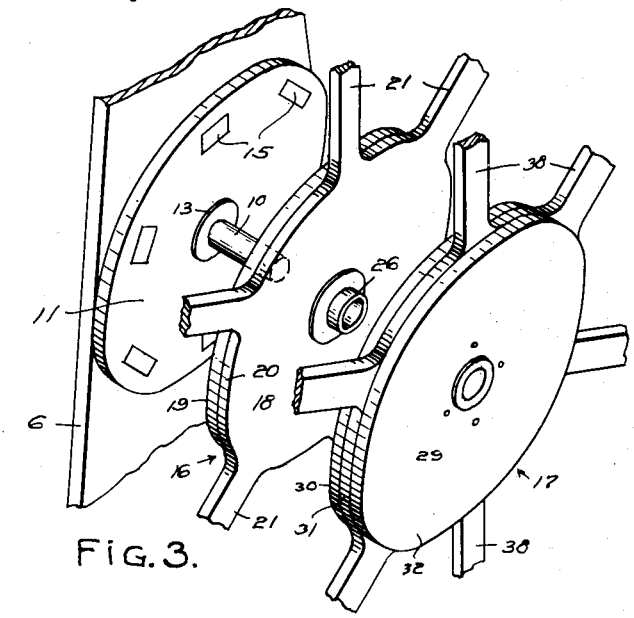
Fig. 3.
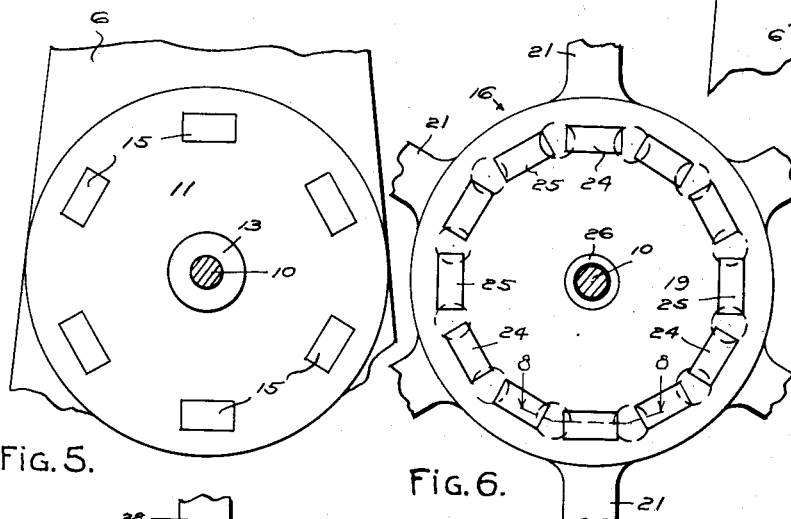
Fig. 5.
Fig. 6.
Fig. 4.
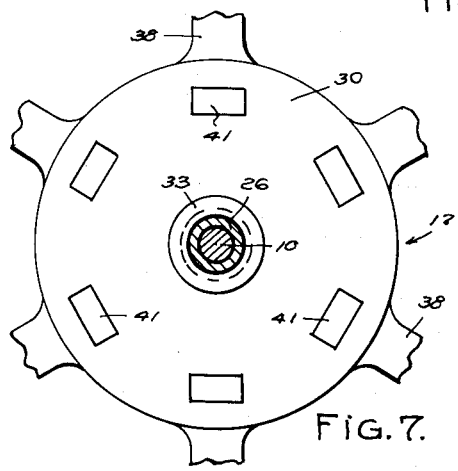
Fig. 7.
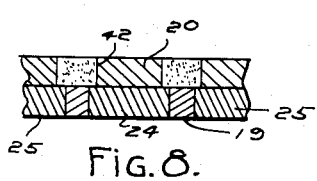
Fig. 8.
*INVENTOR.*
WALTER H. ROTHGERY,
BY
*ATTORNEY.*

Oct. 4, 1955 W. H. ROTHGERY 2,719,718
ROTARY GAME DEVICE

Filed April 12, 1954 3 Sheets-Sheet 3

*INVENTOR.*
WALTER H. ROTHGERY,
BY
*ATTORNEY.*

# United States Patent Office 2,719,718
Patented Oct. 4, 1955

2,719,718

ROTARY GAME DEVICE

Walter H. Rothgery, Miami, Fla.

Application April 12, 1954, Serial No. 422,431

7 Claims. (Cl. 273—142)

This invention relates to an amusement device and has for its object the provision of a plurality of concentric wheel devices that are freely rotatable with respect to each other and which are automatically brought into a predetermined alignment to establish numerical combinations.

A further object of the invention resides in a plurality of wheel-like devices that are rotatable upon a common shaft, and with the wheel devices carrying spaced apart indicia and with the wheel-like devices each having a magnetic attraction toward each other, and with a supporting standard whereby one wheel may be manually spun to cause the other wheel to be rotated through magnetic attraction to establish various indicia combinations at a scoring point that is fixed with respect to the standard.

The invention further contemplates a pair of wheel-like rotatable members that have equidistantly spaced radial spokes, and with the spokes of one wheel carrying simulated animals, such as horses, while the spokes of the other wheel carry simulated riders or jockeys, and with both the horses and the jockeys being numbered and with the wheels and a supporting standard having magnets arranged in a manner to assure of an accurate alignment of the spokes of the two wheels or, with the jockeys being aligned with the horses whereby the various number combinations are obtainable.

Various novel features of construction and operation will be clearly apparent during the course of the following description, reference being had to the accompanying drawings wherein has been illustrated a preferred form of the device and wherein like characters of reference are employed to denote like parts throughout the several figures.

Figure 2:
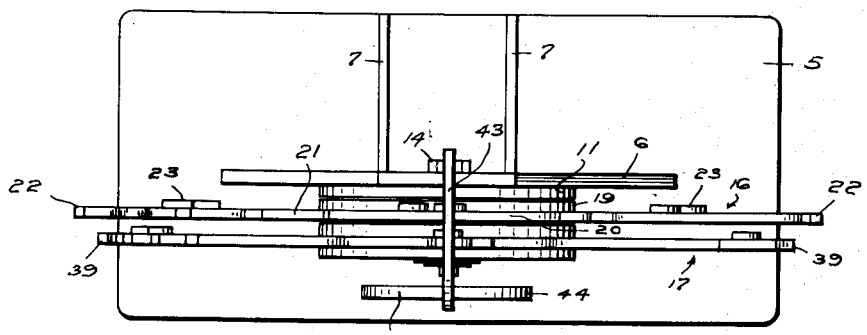

In the drawings:

Figure 1 is a front elevation of an amusement device constructed in accordance with the invention, Figure 2 is a top plan view thereof.

Figure 9:
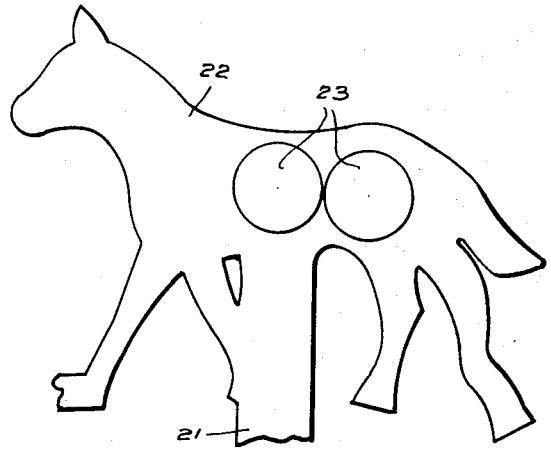
Figure 10:
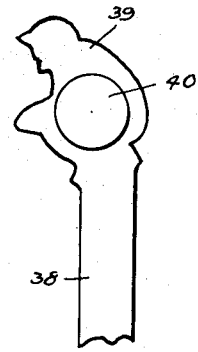
Figure 11:
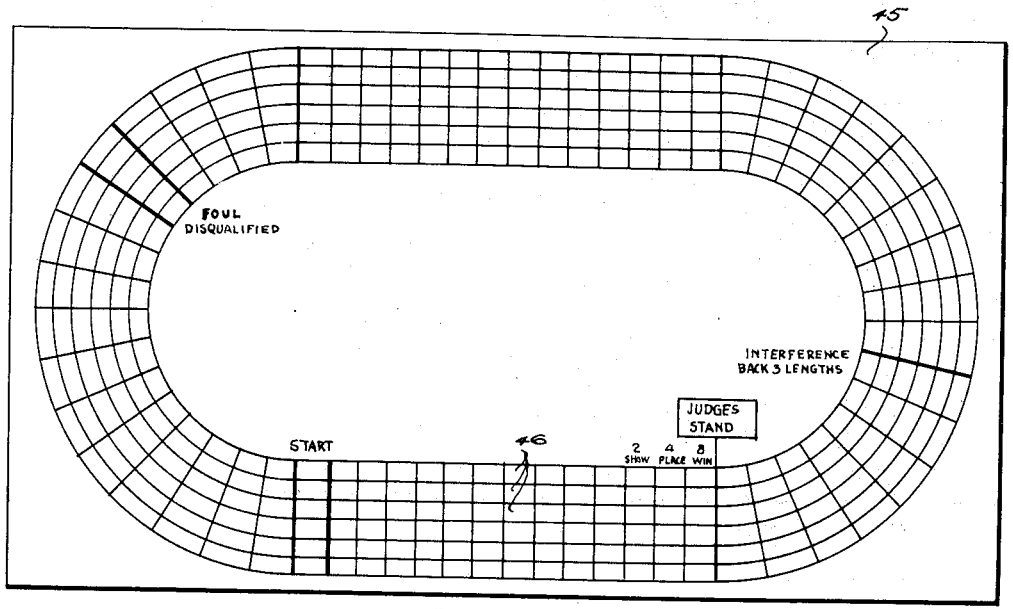
Figure 12:
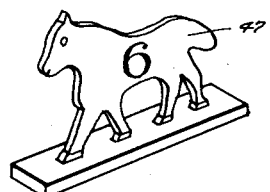

Figure 3 is a fragmentary perspective view of the hub portions and the supporting standard in a separated position, Figure 4 is a fragmentary vertical section taken substantially on line 4—4 of Figure 1, Figure 5 is a vertical section taken on line 5—5 of Figure 4, Figure 6 is a vertical section taken on line 6—6 of Figure 4, Figure 7 is a vertical section taken on line 7—7 of Figure 4, Figure 8 is a fragmentary section taken on line 8—8 of Figure 6, Figure 9 is a rear elevation of the terminal end of one wheel spoke illustrating a counterweighting means for the horses, Figure 10 is a similar view of the terminal end of one spoke of the other wheel showing a counterweighting means for the jockeys, Figure 11 is a plan view of a game board for use with the invention, and Figure 12 is a perspective view of one game piece.

The device of this invention may be formed of various materials, such as plastic, wood, metal or the like, and comprises a flat generally rectangular base 5. Rigidly connected with the base 5 and arranged in a perpendicular manner is a standard 6, here shown as tapering in width upwardly. The standard 6 is suitably braced by rearwardly extending braces 7 connected thereto and with the base 5. The standard 6 at a predetermined point in its height is apertured at 8 for the reception of the reduced end 9 of a forwardly extending subshaft 10. Rigidly connected upon the forward face of the standard 6 is a disc 11 cemented or otherwise connected thereto. The disc 11 is likewise apertured centrally thereof as at 12, and this aperture is in alignment with the aperture 8. The shaft 10 is provided with a fixed collar 13 that bears against the forward face of the disc 11, while the terminal end of the reduced shaft section 9 is threaded for the reception of a clamping nut 14, through the medium of which the shaft 10 is rigidly supported in a horizontal manner for the rotatable support of wheel-like devices, to be presently described. The disc 11 is provided with a plurality of magnets 15, securely anchored within recesses formed in the outer face of the disc 11, and with the outer face of the magnets being flush with the face of the disc. As clearly shown in Figure 5, the magnets 15 are equidistantly spaced and in radial alignment.

Rotatably supported upon the shaft 10 is an inner wheel device 16 and an outer wheel device 17. The inner wheel device 16 includes a hub portion 18 that is cylindrical and of substantially the same diameter as the disc 11. The hub 18, while here shown as being laminated for simplicity of manufacture, will obviously be formed of a single molded or cast structure. The laminations 19 and 20 are cemented, welded or otherwise fixedly connected together in concentric relationship. The hub 18 is provided with a plurality of integral radial spokes 21 that carry at their outer ends preferably simulated animals, such as horses 22. As clearly shown in Figure 1, it is contemplated that the legs of the horses be integrally connected for added strength against any tendency to become broken during their operation. Each of the horses upon their rear surfaces are provided with any desirable counterweights 23 through the medium of which the wheel is successfully balanced with sufficient added weight to cause the wheel to spin a number of times when abruptly actuated manually. The inner face of the lamination 19 is recessed at equidistantly spaced points radially of the aligned reception of magnets 24 and 25. The magnets have their exposed faces flush with the face of the lamination 19. It will be apparent from Figure 6 that the magnets 24 are radially disposed in alignment with the spokes 21, while the magnets 25 are equidistantly spaced between the magnets 24, and with all of the magnets being in radial alignment and spaced outwardly from the center of the hub 18, a distance identical to the outerward spacing of the magnets 15. The hub 18 is centrally apertured and is provided with a bushing 26 that projects beyond the forward face of the lamination 20, as clearly shown in Figures 3 and 4. A spacing washer 27 is disposed over the bushing 26 and is anchored against rotation with respect to the lamination 20. The collar 13 of the shaft 10 forms a spacer for the disc 11 and the lamination 19, whereby the hub 18 is rotatable free of contacting engagement with the disc 11.

Rotatably supported upon the forward end of the shaft 10 through the medium of a bushing 28 is a second hub 29 for the wheel 17. The hub 29 is cylindrical in shape and of a diameter identical to the diameters of the hub 18 and the disc 11. The hub 29 for simplicity in manufacture has likewise been formed of laminations 30, 31 and 32, all securely cemented or welded together into a unitary structure. The bushing 28 is flanged at its inner end as at 33 and the bushing has been counterbored at 34 for the reception of the extended end of the bushing 26, thus the bushing 28 has simultaneous rotation upon the bushing 26 and the forward end of the shaft 10. A washer 35 engages over the end of the bushing 28 and its marginal edge is anchored with respect to the lamination 32. A washer 36 and a screw 37 engage the end of the shaft 10 to prevent displacement of the wheels and also serve as a means to impart sufficient frictional engagement between the flange 33, the washer 27, the bushing 26 and the collar 13, whereby the wheel may be controlled to a fine degree as a retarding means to prevent too free a rotation thereof. The lamination 31 is provided with radial spokes 38, equal in number and spacing to the spokes 21. The spokes 38 carry at their outer ends preferably integral simulated riders or jockeys 39, each of which is provided upon its forward side with an identifying number similar to identifying numbers upon the forward faces of the horses. The rear side of each jockey 39 is preferably provided with weights 40, through the medium of which the wheel may be accurately balanced. The lamination 30 upon its inner face is radially recessed for the reception of magnets 41, equal in number and spacing to the magnets 15 and 24. It may be found desirable when using certain materials in the manufacture of the device that means be provided to increase the magnetic attraction from the magnets 24 and 25 to the magnets 41 and, to insure of a maximum magnetic pull between the magnets, the lamination 20 has been apertured at 42 at spaced apart points radially from the center of the hub, and these apertures are of a sufficient diameter to simultaneously overlie the ends of adjacent magnets 24 and 25, whereby the magnetic force from the magnets 24 and 25 will freely impart their magnetic attraction to the magnets 41. The apertures 42 may be filled with any desirable substance that will not interfere with the magnetic force.

The standard 6 at its upper end is provided with a removable bar 43 that extends forwardly in overlying relation to the wheels 16 and 17. The bar 43 at its forward end supports an open frame 44, here simulating a horseshoe, and the frame constitutes an opening through which the numerical combinations of numbers carried by the horses and the jockeys are determined.

The arrangements of the several magnets are such as to insure that the several spokes 21 and 38 will be accurately aligned in overlying relationship when the wheel stops rotating and with the uppermost spokes 21 and 38 being perpendicular, and with their horse and jockey 22 and 39 framed within the frame 44. The wheel 16 is manually rotated in either direction while the wheel 17, through magnetic attraction between the magnets 24, 25 and 41, will be automatically rotated and will be self-aligning with the wheel 16 when the wheel 16 has come to rest.

It is contemplated that a game board be employed in connection with the wheel device, such a board being illustrated in Figure 11 by the numeral 45. The board has been printed to simulate a race track having a number of continuous courses 46, corresponding to the number of horses 22. Various indicia printed upon the face of the board indicate the manner of playing the game. In Figure 12 there has been indicated one form of game piece 47, such for instance, a simulated horse having its sides numbered in a manner similar to the horses 22. Obviously, the number of game pieces 47 will correspond to the number of horses, and these in turn are progressively moved around their respective courses 46 in accordance with the numerical designation appearing within the frame 44.

The use of the device is as follows:

Assuming the parts to be at a position of rest, shown in Figure 1, the operator manually whirls the horse wheel 16 by grasping a horse and quickly shifting it downwardly to impart the desired momentum. The magnets 24 and 25 impart their magnetic attraction to the magnets 41, causing the jockey wheel 17 to rotate likewise, but at a reduced speed. Now, the wheel 16 will be progressively slowed down due to the magnetic attraction between the magnets 15, 24 and 25, until the wheel is finally caused to come to rest. It is essential, however, that the upper spokes of both wheels be arranged perpendicular when the wheels are at rest, in order that a horse and a jockey shall be aligned with the opening of the frame 44. The magnets 15, 24 and 41 are all set identically in their respective discs 11, 19 and 30 with respect to their polarity. However, the magnets 25 have been reversed as to their polarity. Now, should the horse wheel 16 attempt to stop with its magnet 24 out of alignment with the magnets 15, the propelling influence of the magnets 25 will immediately shift the wheel in either the clockwise or anti-clockwise direction, whereby the magnets 24 will move into the magnetic field of the magnets 15, at which time the wheel will come to rest with its uppermost spoke in a perpendicular position to dispose its respective simulated horse 22 framed within the frame 44. Now, should the jockey wheel 17 attempt to stop with its magnets 41 out of alignment with the magnets 24 and in overlapping relation to the magnets 25, the propelling magnetic force of the magnets 25 will rotate the wheel 17 either clockwise or anti-clockwise to cause the magnets 41 to come within the magnetic field of the magnets 24 and, due to the magnetic attraction, the magnets 41 and 24 will be in overlying and accurate alignment, in which position the spokes 38 will be stopped in overlying parallel alignment with the spokes 21, disposing the simulated jockeys 39 in overlying relation to the horses, with the uppermost horse and uppermost jockey establishing a numerical combination in accordance with their respective indicia. The numerical combination thus indicates first, the particular game piece 47, as indicated upon the horse 22, while the number of moves to be made with the game piece upon the board 45 is determined by the indicia shown on the jockey. Thus, various combinations are possible that adapt the device to many different games and with the magnetic arrangement, one horse and one jockey will always be disposed within the frame 44.

It will therefore be apparent from the foregoing, that a very simple and highly amusing device has been provided. The parts are few and of a nature that readily adapts them to manufacture from various materials in an economic manner and requires little or no attention from the standpoint of wear.

It is to be understood, that while a preferred embodiment of the device has been shown and described, changes are contemplated as readily fall within the spirit of the invention, as determined by the scope of the subjoined claims.

Having described my invention, what I claim as new and desire to secure by Letters Patent is:

1. A rotary game device that includes a rigid standard having a supporting base, a rigid shaft fixed with respect to the standard and which projects forwardly thereof, a plurality of wheels that are independently rotatable upon the shaft and with the wheels being in overlying relation to each other, the wheels having radial and equidistantly spaced spokes that are provided with numerical indicia at their terminal ends, magnetic means carried by the standard and magnetic means carried by each of the wheels and with the magnetic means creating a magnetic attraction between the wheels and the standard, the magnetic means being so arranged that when one wheel is rotated its companion wheel will be caused to rotate by magnetic attraction, the magnets being so arranged that the wheels will always come to rest with their spokes in overlying alignment and with the magnetic means of the standard causing the group of wheels to come to rest with their uppermost spokes perpendicular whereby the numerical indicia of the wheels may be read as a numerical combination and a fixed frame to overlie the numerical combination of the uppermost spokes.

2. The device according to claim 1, wherein the terminal ends of an inner wheel are shaped to simulate horses and the terminal ends of the outermost wheel are shaped to simulate riders, each of the wheels including hub portions and with the several spokes being radial from the hubs and equidistantly spaced apart, each of the hubs having radially disposed magnets that are equidistantly radially arranged from the center of the hubs and in radial alignment with the center line of each spoke, the magnetic means of the standard being identically radially spaced to the magnets of the wheels, one of the wheels being provided with aligning magnets that are radially spaced from the center hub corresponding to the spacing of the first named magnets, the aligning magnets being reversed as to their polarity for propelling the wheels to overlying alignment with respect to each other and for disposing the uppermost spokes in a perpendicular position with respect to the standard.

3. The device according to claim 1, wherein the wheels are spaced apart with respect to each other and wherein the innermost wheel is spaced from the standard, the spokes of the wheels being provided upon their rear faces adjacent their terminal ends with balance weights, the innermost wheel being manually rotatable while the outermost wheel is rotatable under the influence of a magnetic attraction between the wheels, the innermost wheel being progressively retarded to a point of rest by fixed magnets carried by the standard while the outermost wheel is progressively retarded to a point of rest by the magnetic attraction between the wheels.

4. A rotary game device that comprises a flat base and a vertically disposed rigid standard having a flat forward face, the standard having a fixed forwardly extending and horizontally arranged shaft, a plurality of radial and equidistantly spaced magnets carried by the standard and with the magnets being equidistantly spaced from the shaft, inner and outer wheels rotatably supported upon the shaft to rotate in a vertical plane, each wheel having a circular hub portion and a plurality of equidistantly spaced radial spokes, the spokes of the inner wheel at their terminal ends being shaped to simulate horses while the spokes of the outer wheel at their terminal ends are shaped to simulate jockeys, the spokes of the several wheels being equal in number and spacing, the inner face of the hub of the inner wheel being provided with a plurality of radially spaced fixed magnets corresponding to the number and spacing of the first named magnets of the standard and with the magnets of the wheel being in radial alignment with the spokes, the inner face of the hub of the inner wheel being also provided with fixed magnets that are equal in number and spacing and with the last named magnets being equidistantly spaced from the first named magnets of the wheel, the last named magnets being arranged with their polarity in opposed relation to the first named magnets of the wheel, spacing means between the standard and the inner wheel whereby the wheel is rotatable in spaced relation to the standard, the inner face of the hub portion of the outer wheel being provided with a plurality of fixed magnets that are equal in number and spacing to the first named magnets of the inner wheel and the standard, spacing means between the hubs of the inner and outer wheels, the magnets of the standard and the outer wheel and the first named magnets of the inner wheel being identically positioned as to their polarity and means engageable with the outer end of the shaft to prevent displacement of the wheels and which imparts a slight frictional engagement between the hubs and the spacing means.

5. The device according to claim 4, wherein a hub disc of the inner wheel and the radial spokes are integrally formed and with the simulated horses being integrally connected, each of the hubs being provided with a cylindrical bushing that is rotatable upon the shaft and with the bushing of the inner wheel hub being extended forwardly to rotatably engage with a counterbore of the bushing of the hub of the outer wheel.

6. The device according to claim 4, wherein the standard is provided with a fixed disc upon its outer face that is identical in diameter to the diameter of the hubs and concentric thereto, the magnets of the standard being recessed into the disc with exposed faces flush with the forward face of the disc, the magnets of the hubs being recessed into the inner face of the hubs and having exposed faces that are flush with the inner faces of the hubs.

7. The device according to claim 4, wherein the hubs are formed of laminations that are cemented together.

References Cited in the file of this patent

UNITED STATES PATENTS

| | | |
|---|---|---|
| 2,095,367 | Mattson | Oct. 12, 1937 |
| 2,323,837 | Neal | July 6, 1943 |
| 2,588,038 | Pagenhardt | Mar. 4, 1952 |
| 2,671,665 | Rothgery | Mar. 9, 1954 |